US012662409B2

(12) United States Patent
Hu et al.

(10) Patent No.: US 12,662,409 B2
(45) Date of Patent: Jun. 23, 2026

(54) DEVICES AND METHODS FOR A HORIZONTAL SECONDARY STRETCHING OF ULTRA-THIN FLEXIBLE GLASS

(71) Applicant: CAIHONG DISPLAY DEVICES CO., LTD., Xianyang (CN)

(72) Inventors: Weidong Hu, Xianyang (CN); Zuozhen Yuan, Xianyang (CN); Yongjing Ren, Xianyang (CN); Ting Luo, Xianyang (CN)

(73) Assignee: CAIHONG DISPLAY DEVICES CO., LTD., Xianyang (CN)

( * ) Notice: Subject to any disclaimer, the term of this patent is extended or adjusted under 35 U.S.C. 154(b) by 180 days.

(21) Appl. No.: 18/525,740

(22) Filed: Nov. 30, 2023

(65) Prior Publication Data

US 2024/0190751 A1     Jun. 13, 2024

Related U.S. Application Data

(63) Continuation of application No. PCT/CN2023/084879, filed on Mar. 29, 2023.

(30) Foreign Application Priority Data

Dec. 9, 2022     (CN) .......................... 202211584233.1

(51) Int. Cl.
*C03B 23/037*     (2006.01)
*C03B 23/00*     (2006.01)

(52) U.S. Cl.
CPC ........ *C03B 23/037* (2013.01); *C03B 23/0086* (2013.01)

(58) Field of Classification Search
CPC ..... C03B 23/037; C03B 23/03; C03B 23/203; C03B 27/044; C03B 18/06; C03B 17/068; C03B 23/20; C03B 29/04
See application file for complete search history.

(56) References Cited

U.S. PATENT DOCUMENTS

| | | | |
|---|---|---|---|
| 4,354,866 A | 10/1982 | Mouly | |
| 2015/0096330 A1* | 4/2015 | Aburada ............... | C03B 17/068 |
| | | | 65/185 |
| 2021/0276127 A1* | 9/2021 | Kumkar ............. | B23K 26/0604 |

FOREIGN PATENT DOCUMENTS

| | | | |
|---|---|---|---|
| CN | 101031516 A | | 9/2007 |
| CN | 102690048 A | * | 9/2012 |

(Continued)

OTHER PUBLICATIONS

International Search Report in PCT/CN2023/084879 mailed on Sep. 6, 2023, 6 pages.

(Continued)

*Primary Examiner* — Erin Snelting
*Assistant Examiner* — Steven S Lee
(74) *Attorney, Agent, or Firm* — PORUS IP LLC

(57) ABSTRACT

Devices for a horizontal secondary stretching of ultra-thin flexible glass are provided. The device includes: a feeding unit, a welding unit, a preheating unit, a transverse stretching extension unit, a longitudinal traction stretching unit, an annealing unit, and a winding and wrapping unit connected in sequence. Each of the feeding unit, the welding unit, the preheating unit, the transverse stretching extension unit, the longitudinal traction stretching unit, the annealing unit, and the winding and wrapping unit is provided with an air floatation device and a roller. Each of the preheating unit, the transverse stretching extension unit, the longitudinal traction stretching unit, and the annealing unit is provided with a heating unit. Each of the longitudinal traction stretching unit and the annealing unit is provided with a cooling mechanism.

8 Claims, 6 Drawing Sheets

(56)  References Cited

FOREIGN PATENT DOCUMENTS

| | | | | | |
|---|---|---|---|---|---|
| CN | 104211284 | A | | 12/2014 | |
| CN | 106746548 | A | * | 5/2017 | ........... C03B 27/044 |
| CN | 108383359 | A | | 8/2018 | |
| CN | 210683586 | U | | 6/2020 | |
| CN | 112171063 | A | * | 1/2021 | ......... B23K 26/0643 |
| CN | 113185096 | A | | 7/2021 | |
| CN | 113602813 | A | * | 11/2021 | ............. B65G 43/08 |
| CN | 113698079 | A | * | 11/2021 | ........... C03B 23/203 |
| CN | 114751635 | A | | 7/2022 | |
| CN | 115304253 | A | | 11/2022 | |
| GB | 1313743 | A | | 4/1973 | |
| JP | 2018193284 | A | | 12/2018 | |

OTHER PUBLICATIONS

Written Opinion in PCT/CN2023/084879 mailed on Sep. 6, 2023, 5 pages.
The First Office Action in Chinese Application No. 202211584233.1 mailed on Jun. 21, 2024, 23 pages.
The Second Office Action in Chinese Application No. 202211584233.1 mailed on Jan. 16, 2025, 22 pages.
Liu, Xiaoyong, Technology of Glass Production, Chemical Industry Press, 2008, 10 pages.

* cited by examiner

DEVICES AND METHODS FOR A HORIZONTAL SECONDARY STRETCHING OF ULTRA-THIN FLEXIBLE GLASS

CROSS-REFERENCE TO RELATED APPLICATIONS

This application is a Continuation of International Application No. PCT/CN2023/084879, filed on Mar. 29, 2023, which claims priority to Chinese Patent Application No. 202211584233.1, filed on Dec. 9, 2022, the entire contents of each of which are hereby incorporated by reference.

TECHNICAL FIELD

The present disclosure relates to the field of flexible glass manufacturing technology, and in particular, to devices and methods for a horizontal stretching of ultra-thin flexible glass.

BACKGROUND

A ultra-thin flexible glass refers to glass with a thickness of less than 0.1 mm and a certain bending degree. It is widely used in the field of electronic products due to advantages such as good flatness, flexibility, optical properties, heat-resistant stability, surface smoothness, and stable chemical properties.

Currently, three direct production manners of the ultra-thin flexible glass such as float, overflow, and slit pull-down, are provided. A principle of a float production process of ultra-thin glass is basically the same as that of an ordinary float production process. However, the float production of ultra-thin glass requires high requirements for process control and device, and has a large production difficulty. The biggest advantage of the overflow pull-down process is that the produced glass has a good surface quality. However, due to the extreme difficulty in controlling the production process of ultra-thin glass and the high technical requirements, an industrialization degree of the overflow pull-down process is not high. When the flexible glass is prepared using the slit pull-down manner, a surface of the flexible glass comes into contact with the slit, so that the surface quality of the glass may be affected by a shape and material of the slit. Therefore, the produced flexible glass products need to undergo a secondary polishing, which is complex, costly, and low in production capacity. Indirect production manners of ultra-thin flexible glass include a chemical thinning manner and a secondary stretching manner. The two manners may only carry out small-scale production and may not meet market demands. Additionally, the flexible glass substrates produced using the chemical thinning manner may have defects such as scratches and dents, which require polishing. For the flexible glass, the surface polishing process is extremely difficult, which may easily lead to glass breakage, thereby reducing the yield. The current of secondary stretching manner heats the glass preformed embryo using a heating furnace to make a temperature of the glass preformed embryo reach a softening temperature, which achieves the pulling of the flexible glass and performs annealing treatment on the flexible glass. Disadvantages of the current of secondary stretching manner include that the flexible glass fails to be produced continuously, the high plant configuration is high, the yield is low, and the current of secondary stretching manner is difficult to be controlled. Additionally, the flexible glass produced by the heating furnace may be bent downward due to gravity, so that the quality of the produced flexible glass may not be guaranteed.

Therefore, it is desirable to provide devices and methods for a horizontal secondary stretching of ultra-thin flexible glass to solve problems that existing devices and manners may not realize continuous production and may not guarantee the product quality.

SUMMARY

One embodiment of the present disclosure provides a device for a horizontal secondary stretching of ultra-thin flexible glass. The device comprises: a feeding unit, a welding unit, a preheating unit, a transverse stretching extension unit, a longitudinal traction stretching unit, an annealing unit, and a winding and wrapping unit connected in sequence. Each of the feeding unit, the welding unit, the preheating unit, the transverse stretching extension unit, the longitudinal traction stretching unit, the annealing unit, and the winding and wrapping unit is provided with an air floatation device and a roller, the air floatation device is disposed on an upper side and a lower side of a raw glass sheet, the air floatation device being configured to maintain a pressure difference between an upper part and a lower part of the raw glass sheet, the roller is disposed on two sides of a width direction of the raw glass sheet, the roller being configured to clamp and transport the raw glass sheet; and each of the preheating unit, the transverse stretching extension unit, the longitudinal traction stretching unit, and the annealing unit is provided with a heating unit, the heating unit being disposed between the air floatation device and the raw glass sheet, and each of the longitudinal traction stretching unit and the annealing unit is provided with a cooling mechanism, the cooling mechanism being disposed between the heating unit and the raw glass sheet.

One embodiment of the present disclosure provides a stretching method of the device for a horizontal secondary stretching of ultra-thin flexible glass. The stretching method comprises: activating the device for a horizontal secondary stretching of ultra-thin flexible glass, transmitting the raw glass sheet into the welding unit through the feeding unit, completing the welding of the two anteroposterior raw glass sheets in the welding unit, the raw glass sheet being configured to enter the preheating unit of a stretching furnace for preheating, enter the transverse stretching extension unit for transverse stretching, enter the longitudinal traction stretching unit for cooling and longitudinal traction stretching, and enter the annealing unit for cooling, and the raw glass sheet being configured to enter the winding and wrapping unit for product wrapping.

BRIEF DESCRIPTION OF THE DRAWINGS

The present disclosure is further illustrated in terms of exemplary embodiments. These exemplary embodiments are described in detail according to the drawings. These embodiments are non-limiting exemplary embodiments, in which like reference numerals represent similar structures, wherein.

Figure 1:
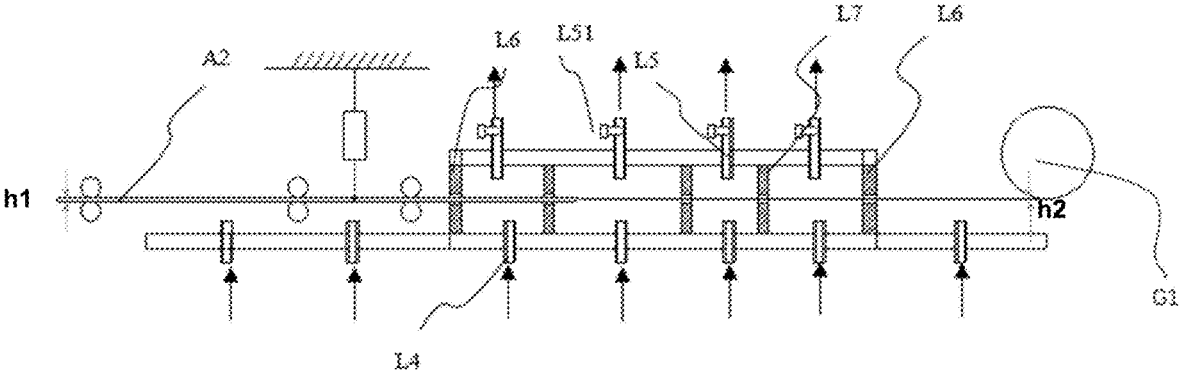
FIG. 1 is an overall schematic diagram of an air floatation device according to some embodiments of the present disclosure.

In the FIGURES, A—feeding unit; A1—transmission clamping wheel I; A2—raw glass sheet; B—welding unit; B1—welding line; B2—laser welder; C—preheating unit; C1—transmission clamping wheel II; D—transverse stretching extension unit; D1—transverse clamping extension wheel; D2—turbine rotating shaft; E—longitudinal traction stretching unit; E1—stretching clamping wheel II; F—annealing unit; F1—stretching clamping wheel II; T1—temperature detector; T2—heating device; G—winding and wrapping unit; G1—winding mechanism; L—upper-upper cooling mechanism; L—lower-lower cooling mechanism; L1—heat preservation layer; L2—lower soaking plate; L3—upper soaking plate; L21—lower soaking plate pore; L31—upper soaking plate pore; L4—air inlet pipe; L5—air suction pipe; L51—opening control valve; L6—furnace door mechanism; L7—partition spacer plate.

DETAILED DESCRIPTION

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

It should be noted that the terms "first," "second," etc., used in the present disclosure, claims of the present disclosure, and the accompanying drawings described above are used to distinguish similar objects and do not need to be used to describe a specific order or sequence. It should be understood that the data used in this manner may be interchangeable as appropriate, so that the embodiments of the present disclosure described herein may be implemented in an order other than that illustrated or described herein. In addition, the terms "comprising," "having," and any variations thereof are intended to cover non-exclusive inclusions. For example, a process, method, system, product, or device that includes a series of steps or units is not limited to those steps or units that are clearly listed, but may include other steps or units that are not clearly listed or are inherent to the process, method, product, or device.

A raw glass sheet A2 refers to a substrate glass produced by an overflow manner. In some embodiments, a size of the raw glass sheet A2 includes but is not limited to 1800×

1500×(0.4~0.5) mm. When the device for a horizontal secondary stretching of ultra-thin flexible glass is used, the raw glass sheet A2 is configured to horizontally passed through a middle of the entire device to complete the secondary stretching of the raw glass sheet A2.

Figure 2:
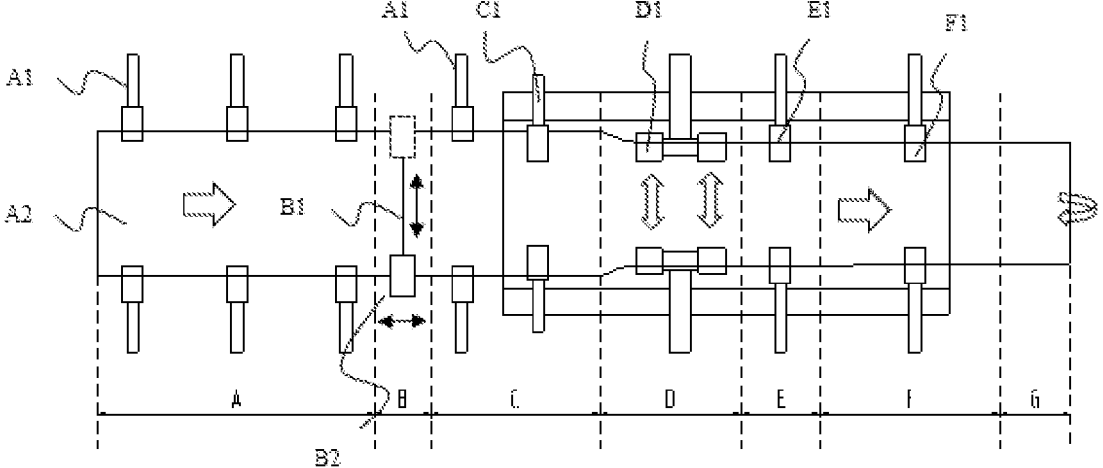
FIG. 2 is an exemplary top view of a device for a horizontal secondary stretching of ultra-thin flexible glass according to some embodiments of the present disclosure.
Figure 3:
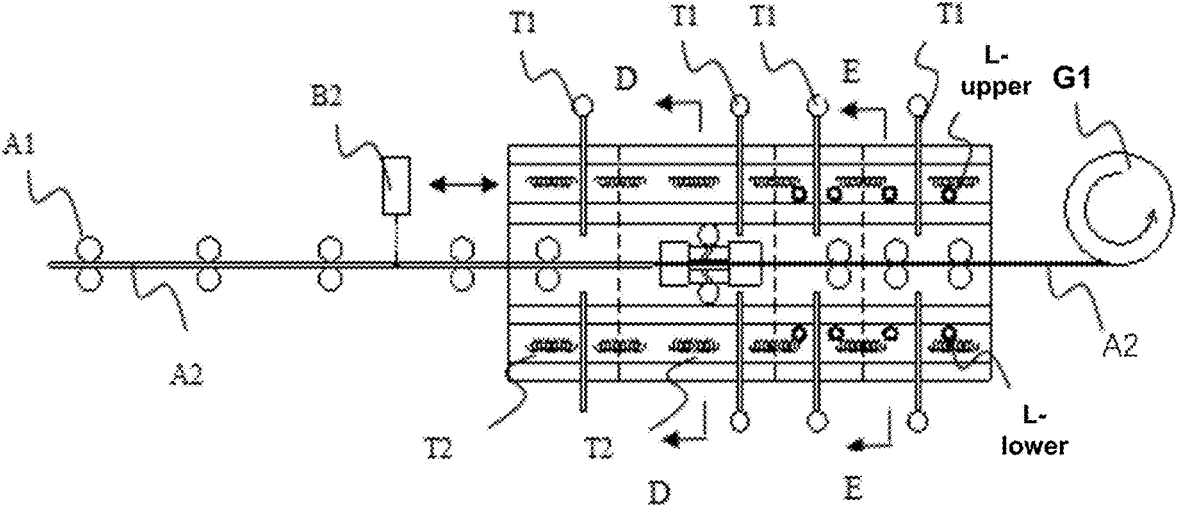
FIG. 3 is an exemplary front view of a device for a horizontal secondary stretching of ultra-thin flexible glass according to some embodiments of the present disclosure.
Figure 4:
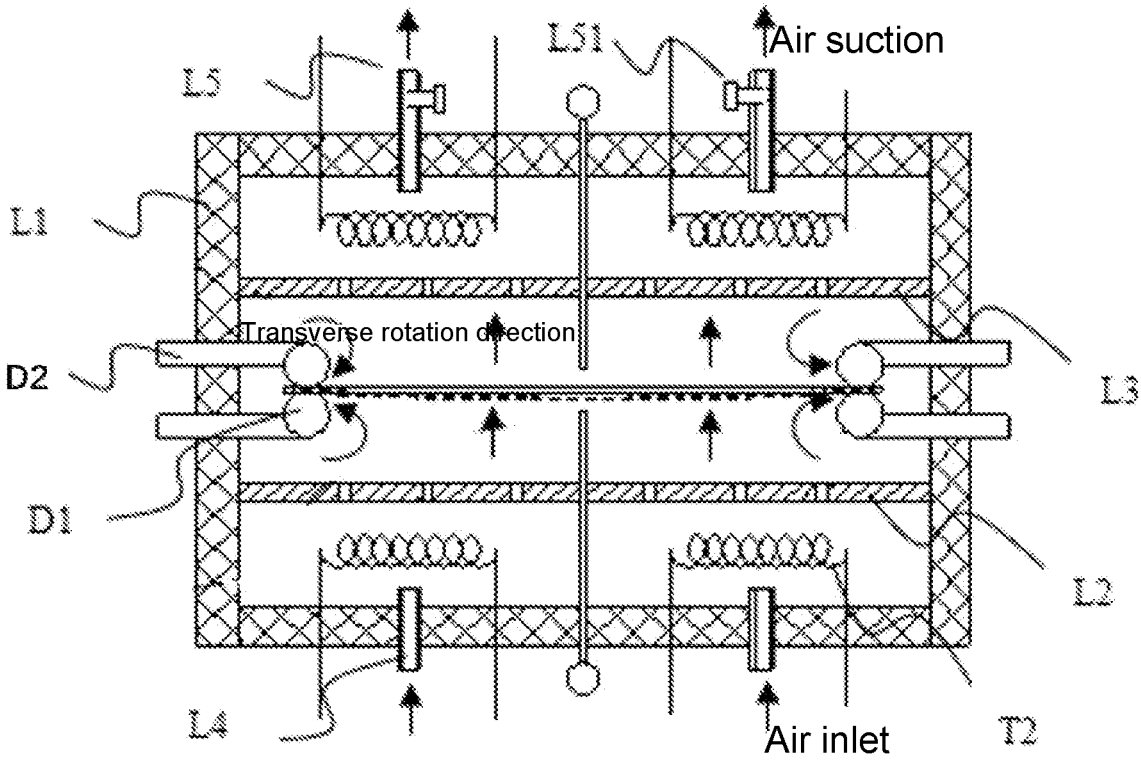
FIG. 4 is an exemplary cross-sectional view of a device for a horizontal secondary stretching of ultra-thin flexible glass along a section D-D according to FIG. 3.
Figure 5:
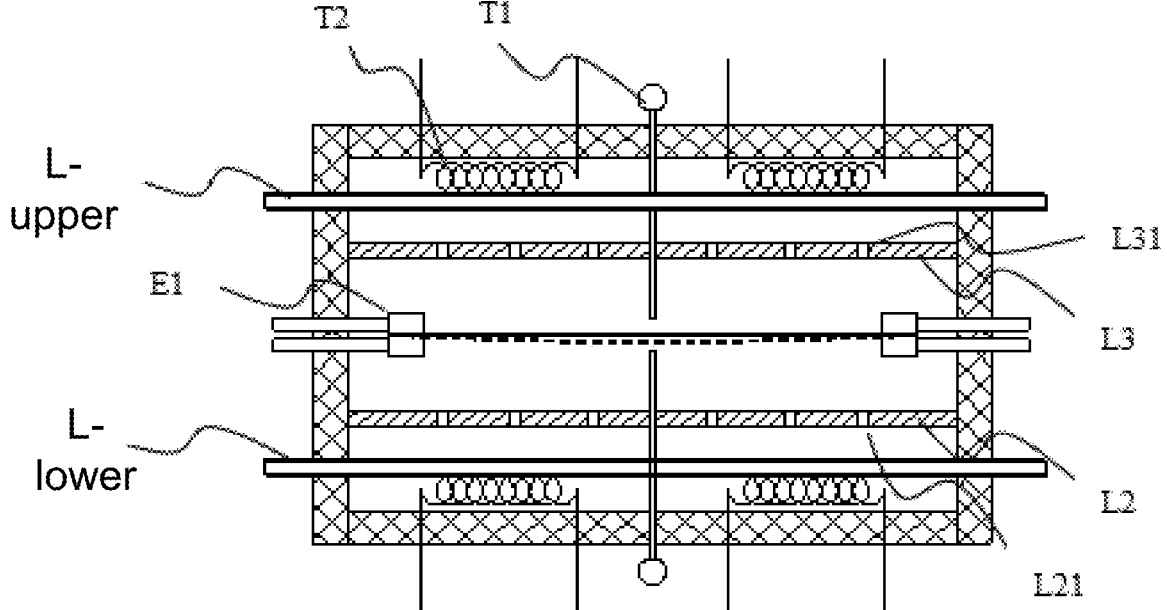
FIG. 5 is an exemplary cross-sectional view of a device for a horizontal secondary stretching of ultra-thin flexible glass along a section E-E according to FIG. 3.

FIG. 1 is an overall schematic diagram of an air floatation device according to some embodiments of the present disclosure. FIG. 2 is an exemplary top view of a device for a horizontal secondary stretching of ultra-thin flexible glass according to some embodiments of the present disclosure. FIG. 3 is an exemplary front view of a device for a horizontal secondary stretching of ultra-thin flexible glass according to some embodiments of the present disclosure. FIG. 4 is an exemplary cross-sectional view of a device for a horizontal secondary stretching of ultra-thin flexible glass along a section D-D according to FIG. 3. FIG. 5 is an exemplary cross-sectional view of a device for a horizontal secondary stretching of ultra-thin flexible glass along a section E-E according to FIG. 3.

As shown in FIGS. 1-3, in some embodiments, the device for a horizontal secondary stretching of ultra-thin flexible glass includes a plurality of air floatation devices, a heating unit, a plurality of cooling mechanisms, and further includes the feeding unit A, the welding unit B, the preheating unit C, the transverse stretching extension unit D, the longitudinal traction stretching unit E, the annealing unit F, and the winding and wrapping unit G connected in sequence. Each of the feeding unit A, the welding unit B, the preheating unit C, the transverse stretching extension unit D, the longitudinal traction stretching unit E, the annealing unit F, and the winding and wrapping unit G is provided with an air floatation device and a roller. An air floatation device disposed on an upper side and a lower side of the raw glass sheet A2 is used to maintain a pressure difference between an upper part and a lower part of the raw glass sheet A2. The roller disposed on two sides of a width direction of the raw glass sheet A2 is used to clamp and transport the raw glass sheet A2. Each of the preheating unit C, the transverse stretching extension unit D, the longitudinal traction stretching unit E, and the annealing unit F is provided with a heating unit. The heating unit is disposed between the air floatation device and the raw glass sheet A2. Each of the longitudinal traction stretching unit E and the annealing unit F is provided with a cooling mechanism. The cooling mechanism is disposed between the heating unit and the raw glass sheet A2.

The air floatation device refers to a device for maintaining the pressure difference between the upper part and the lower part of the raw glass sheet. As shown in FIG. 1, in some embodiments, the air floatation device includes a plurality of air inlet pipes L4, a plurality of opening control valves L51, and a plurality of air suction pipes L5. In some embodiments, the air inlet pipes L4 are disposed at a bottom of the feeding unit A, a bottom of the welding unit B, a bottom of the preheating unit C, a bottom of the transverse stretching extension unit D, a bottom of the longitudinal traction stretching unit E, a bottom of the annealing unit F, and a bottom of the winding and wrapping unit G. In some embodiments, the air suction pipes L5 are disposed at a top of the preheating unit C, a top of the transverse stretching extension unit D, a top of the longitudinal traction stretching unit E, and a top of the annealing unit F. In some embodiments, the opening control valves L51 are disposed outside the air suction pipes L5. The air suction pipes L5 are connected to fans for exhaust air. Exhaust air volumes may be adjusted by the opening control valves L51. In some embodiments, the heating unit heats internal zones of the device for a horizontal secondary stretching of ultra-thin flexible glass to a set temperature. Air entering the internal zones of the device for a horizontal secondary stretching of ultra-thin flexible glass through the air flotation devices (i.e., the air intake pipes L4) is purified air, and the purified air may be preheated in the internal zones. The internal zones include zones corresponding to the feeding unit A, the welding unit B, the preheating unit C, the transverse stretching extension D, the longitudinal traction stretching unit E, the annealing unit F, and the winding and wrapping unit G in the device for a horizontal secondary stretching of ultra-thin flexible glass. In some embodiments, the purified air enters the feeding unit A, the welding unit B, and the winding and wrapping unit G through the air inlet pipes L4 to be preheated, the preheated air reduces an arc-shaped sagging tendency of the raw glass sheet A2. In some embodiments, in the preheating unit C, the transverse stretching extension unit D, the longitudinal traction stretching unit E, and the annealing unit F, gas flow rates of the air inlet pipes L4 and flow rate opening of the air suction pipes L5 are coordinated, and the opening control valves L51 of suction are adjusted to maintain the pressure difference between the upper part and the lower part of the raw glass sheet A2. That is, the pressure difference of the lower part of the raw glass sheet A2 is greater than that of the upper part, thereby reducing the arc-shaped sagging tendency of the raw glass sheet A2. The arc-shaped sagging tendency of the raw glass sheet A2 is shown by the dotted lines in FIG. 4 and FIG. 5.

In some embodiments, as shown in FIG. 2, the each of the feeding unit A, the welding unit B, and the preheating unit C is provided with a plurality of sets of clamping transmission rollers.

The clamping transmission rollers refer to devices used to clamp and transmit the raw glass sheet A2. In some embodiments, the clamping transmission rollers are symmetrically disposed along a width direction of the stretching device to clamp the raw glass sheet A2 and transmit the raw glass sheet A2 at a speed of V1.

The feeding unit A is a device used to transmit the transmission clamping wheels I A1. In some embodiments, the feeding unit A is used to clamp the raw glass sheet A2 through the transmission clamping wheel I A1 and transmit the raw glass sheet A2 in a length direction for feeding. The length direction refers to the horizontal arrow shown in FIG. 2.

The welding unit B is a device for welding the raw glass sheet A2. In some embodiments, the welding unit B further includes a laser welder B2 configured to reciprocate in a width direction of the stretching device. The width direction refers to the direction perpendicular to the horizontal arrow shown in FIG. 2. The laser welder B2 is fixed above the raw glass sheet A2 by a bracket mounted outside a furnace body entrance and is configured to reciprocate along the width direction of the raw glass sheet A2. The laser welder B2 is capable of tracking positions of two anteroposterior raw glass sheets A2 and completing the welding of the two raw glass sheets A2. The welding line B1 of the two welded raw glass sheets A2 is shown in FIG. 2.

In some embodiments, the laser welder B2 may be configured to move back and forth with the horizontal transmission device, thereby achieving continuous welding and production of the raw glass sheet.

The preheating unit C is a device for preheating the raw glass sheet A2.

The heating unit is a device for heating the raw glass sheet A2. In some embodiments, each of the preheating unit C, transverse stretching extension unit D, longitudinal traction stretching unit E, and annealing unit F is provided with the heating unit.

In some embodiments, as shown in FIGS. 4 and 5, the heating unit is configured to adopt an upper and lower heating manner. The heating unit includes a heat preservation layer L1, which may ensure temperatures above and below the raw glass sheet A2. In some embodiments, the heat preservation layer L1 is provided with a plurality of heating devices T2 and a soaking plate. The soaking plate is horizontally and symmetrically disposed on two sides of the raw glass sheet A2 and is made of a silicon-carbide material.

In some embodiments, the soaking plate consists of an upper soaking plate L3 and a lower soaking plate L2. The upper soaking plate L3 and the lower soaking plate L2 are used to form a relatively sealed soaking plate space. In some embodiments, the upper soaking plate L3 is provided with a plurality of evenly distributed upper soaking plate pores L31, and the lower soaking plate L2 is provided with a plurality of evenly distributed lower soaking plate pores L21.

In some embodiments, the heating devices T2 are horizontally disposed outside the soaking plate. The heating devices T2 are made of an iron-chromium-aluminum material or a silicon-molybdenum material.

In some embodiments, the heat preservation layer L1 is embedded with a plurality of temperature detectors T1. The temperature detectors T1 are configured to pass through the heat preservation layer L1 and the soaking plate, and have a certain distance from the raw glass sheet A2. The temperature detectors T1 are symmetrically mounted at the top and bottom of the heat preservation layer L1.

In some embodiments, two sides of the heat preservation layer L1 are provided with a furnace door mechanisms L6. A plurality of partition spacer plates L7 are disposed longitudinally inside the heat preservation layer L1 at an interval. The furnace door mechanisms L6 and the partition spacer plates L7 are used to make space of each zone relatively independent.

In some embodiments, the furnace door mechanisms L6 and the partition spacer plates L7 in the furnace are configured to cooperate with an air inlet disposed at the bottom of the raw glass sheet A2 and an air suction disposed at the top of the raw glass sheet A2, so that the pressure difference of the lower part of the raw glass sheet A2 in the furnace is greater than that of the upper part of the raw glass sheet A2 in the furnace in the transmission process, thereby making the original glass sheet A2 in a horizontal state, and effectively inhibiting downward bending of the raw glass sheet A2 during horizontal transmission and stretching. At the same time, an upper surface and a lower surface of the raw glass sheet A2 do not touch other parts of the device in the transmission process, so as to ensure the surface quality of the raw glass sheet A2.

In some embodiments, the air inlet pipes L4 in the air flotation devices are configured to pass through the bottom of the heat preservation layer L1. Clean air input by the air inlet pipes L4 enters space below the raw glass sheet A2 through the lower soaking plate pores L21. In some embodiments, the air suction pipes L5 are configured to pass through the top of the heat preservation layer L1. Gas in space above the raw glass sheet A2 is discharged through the upper soaking plate pores L31 and the air suction pipes L5.

In some embodiments, a gas temperature of the gas in the air floatation device is consistent with a temperature of the feeding unit, a temperature of the welding unit, a temperature of the preheating unit, a temperature of the transverse stretching extension unit, a temperature of the longitudinal traction stretching unit, a temperature of the annealing unit, and a temperature of the winding and wrapping unit. In some embodiments, when the device for a horizontal secondary stretching of ultra-thin flexible glass is used, the temperature of the preheating unit C may be controlled above a softening point by controlling the heating devices T2 through the temperature detectors T1. In some embodiments, the temperature of the preheating unit C is controlled at 1000° ° C. to 950° C. In some embodiments, the temperature of the transverse stretching extension unit D is controlled above an annealing point. In some embodiments, the temperature of the transverse stretching extension unit D is controlled at 950° C. to 900° C. In some embodiments, the temperature of the longitudinal traction stretching unit E is controlled at 900° C. to 750° C. In some embodiments, the temperature of the annealing unit F is controlled at 750° C. to 600° C., and a temperature of an annealing outlet is controlled at 300° C. to 250° C.

The transverse stretching extension unit D is a device used for horizontally stretching the raw glass sheet A2. In some embodiments, the transverse stretching extension unit D includes a plurality of transverse clamping extension wheels D1. The transverse clamping extension wheels D1 are made of a high-temperature resistant metal material and have patterns on surfaces that increase the friction force. In some embodiments, when the transverse clamping extension wheels D1 clamp the raw glass sheet A2, the patterns on the surfaces of the transverse clamping extension wheels D1 are embedded with the softened raw glass sheet A2. In some embodiments, the transverse clamping extension wheels D1 are mounted on two sides of a worm of a turbine worm mechanism. The turbine rotating shafts D2 are configured to extend out of the furnace body. External turbine drive shafts D2 are configured to drive the transverse clamping extension wheels D1 mounted on the two sides of the worm of the turbine worm mechanism to rotate, i.e., rotate in a direction perpendicular to a transmission direction. The transverse clamping extension wheels D1 may be used to inhibit contraction of the raw glass sheet A2 in the width direction, which achieves transverse extension of the glass.

In some embodiments, the clamping transmission rollers are used to achieve transverse clamping and traction stretching in the width direction of the raw glass sheet A2 through the turbine worm mechanism, thereby inhibiting contraction of the raw glass sheet.

The longitudinal traction stretching unit E is a device used to perform cooling and a longitudinal traction stretching on the raw glass sheet A2. In some embodiments, the longitudinal traction stretching unit E includes the stretching clamping wheels I E1. When a thickness of the raw glass sheet A2 is 0.5 mm, the traction stretching of the stretching clamping wheels I E1 enables the production of flexible glass with a thickness less than 0.1 mm.

The annealing unit F is a device used for cooling the raw glass sheet A2. In some embodiments, the annealing unit F includes stretching clamping wheels II F1.

The winding and wrapping unit G is a device used for product wrapping. In some embodiments, the winding and wrapping unit G includes the rotating winding mechanism G1. The winding mechanism G1 is disposed outside the annealing unit F and controlled by an independent rotating mechanism. In some embodiments, when the raw glass sheet A2 enters the winding and wrapping unit G, the winding mechanism G1 may be used to wrap the raw glass sheet A2 to achieve continuous production.

In some embodiments, a rotational speed ratio of the clamping transmission rollers, the stretching clamping wheels I, and the stretching clamping wheels II is 1:n:n, wherein n is a ratio of the thickness of the raw glass sheet to a thickness of a stretched flexible glass.

In some embodiments, a plurality of sets of the transverse clamping extension wheels D1, a plurality of sets of stretching clamping wheels I E1, and a plurality of sets of stretching clamping wheels II F1 are symmetrically disposed along the width direction of the stretching device to be used to clamp the raw glass sheet A2 and transmit the raw glass sheet at a rotational speed V2. In some embodiments, a ratio of the rotational speed V2 to the rotational speed V1 of the clamping transmission rollers is denoted as n, and n may be determined by the following equation (1).

$$n = \frac{h1}{h2} \tag{1}$$

wherein h1 denotes the thickness of the raw glass sheet A2, and h2 denotes the thickness of the stretched flexible glass. In some embodiments, the rotational speed ratio of V2 to V1 is 5:1.

In some embodiments, the flexible glass of different thicknesses may be obtained by setting the rotational speed ratios of the clamping transmission rollers, the stretching clamping wheels I, and the stretching clamping wheels II (i.e., by performing longitudinal traction stretching on the raw glass sheet A2 at different speed ratios).

In some embodiments, the stretching clamping wheels I E1 and the stretching clamping wheels II F1 are made of an asbestos-like material to create a relatively great friction force with the raw glass sheet A2. In some embodiments, the clamping transmission rollers are fixed on the periphery of the feeding unit A and the welding unit B through independent support mechanisms to be used to directly clamp the glass. In some embodiments, the transmission clamping wheels II C1, the transverse clamping extension wheels D1, the stretching clamping wheels I E1, and the stretching clamping wheels II F1 are respectively fixed in the preheating unit C, the transverse stretching extension unit D, the longitudinal traction stretching unit E, and the annealing unit F through independent support mechanisms. The preheating unit C, the transverse stretching extension unit D, the longitudinal traction stretching unit E, and the annealing unit F are configured to extend into the furnace through corresponding mounting holes on sides thereof to clamp the glass.

The cooling mechanism is a device for cooling the raw glass sheet A2. In some embodiments, the cooling mechanisms are disposed inside the longitudinal traction stretching unit E and the annealing unit F. The cooling medium of the cooling mechanisms includes cooling water or cooling air. In some embodiments, each cooling mechanism includes an upper cooling mechanism L-upper and a lower cooling mechanism L-lower. The upper cooling mechanism L-upper is disposed between the upper soaking plate L3 and the heating devices T2, and the lower cooling mechanism L-lower is disposed between the lower soaking plate L2 and the heating devices T2.

Figure 6:
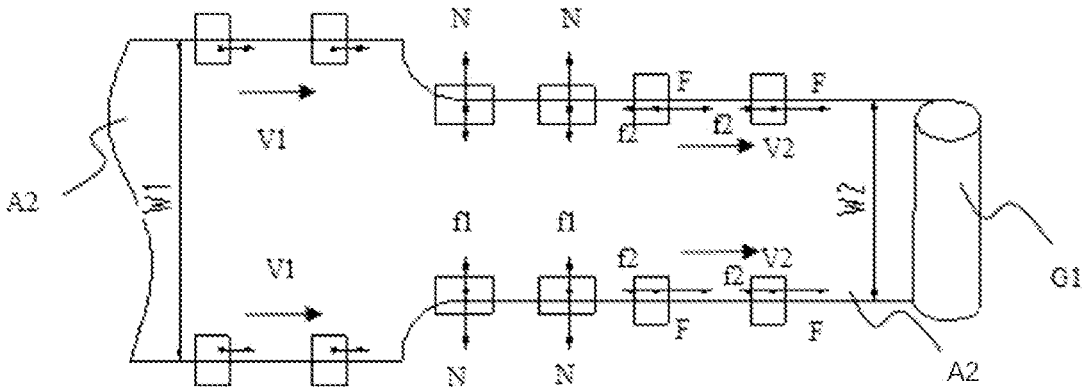
FIG. 6 is a schematic diagram illustrating a principle and a method for stretching extension according to some embodiments of the present disclosure.

FIG. 6 is a schematic diagram illustrating a principle and a method for stretching extension according to some embodiments of the present disclosure. The working principle of the device for a horizontal secondary stretching of ultra-thin flexible glass may be illustrated as follows. As shown in FIG. 6, a width of the raw glass sheet A2 is W1, and a clamping transmission speed is V1. After preheated by the preheating unit C, the raw glass sheet A2 enters the transverse stretching extension unit D. After clamped by the transverse clamping extension wheels D1, the raw glass sheet A2 is subjected to an outward force N in a width direction, and the outward force N is greater than an inward contraction force f1 (i.e., N>f1). At this time, a traction stretching speed in the length direction of the raw glass sheet A2 is V2, and the raw glass sheet A2 enters the longitudinal traction stretching unit E after passing through the transverse stretching extension unit D. After clamped by the stretching clamping wheels I E1, a longitudinal stretching force F subjected by the raw glass sheet A2 is greater than a glass longitudinal viscous resistance f2. A stretching coefficient is a ratio of the traction stretching speed V2 to the clamping transfer speed V1, and the stretching coefficient is in a range of 4.0-5.0. After stretching, the width of the raw glass sheet A2 is W2. The raw glass sheet A2 enters the winding and wrapping unit G for product wrapping. A wrapping speed of the winding and wrapping unit G may be expressed by the equation W=V/R, wherein R denotes a sum of a radius of a wrapping wheel and a product of the thickness of the raw glass sheet A2 and a period.

In some embodiments, the stretching the raw glass sheet by the device for a horizontal secondary stretching of ultra-thin flexible glass includes the following operations.

In S1, activating the device for a horizontal secondary stretching of ultra-thin flexible glass, activating the heating unit to preheat a temperature of each zone to a set temperature, and at the same time, activating the air floatation devices, the cooling mechanisms, and the roller assemblies (i.e., clamping transmission rollers, transverse clamping extension wheels D1, stretching clamping wheels I E1, stretching clamping wheels II F1, and winding mechanism G1). In the process of use, the raw glass sheet A2 produced by the overflow manner is transmitted into the welding unit B via the feeding unit A. The raw glass sheet A2 contacts an anterior raw glass sheet A2. The laser welder B2 is activated and completes the welding by tracking with the transmission speed V and moving along the transverse and length directions simultaneously.

In S2, the welded raw glass sheet A2 is transmitted from the welding unit B to the preheating unit C of a stretching furnace. The temperature of the heating devices T2 is controlled at 1000° C. to 950° C. by the temperature detectors T1, the transmission speed of the raw glass sheet A2 is controlled by the transmission clamping wheels I to be V1, and the raw glass sheet A2 is preheated in the preheating unit C for 20 s to 30 s. When the temperature of the preheated raw glass sheet A2 reaches the vicinity of the softening point, due to the movement of internal mass particles, a retraction phenomenon may occur. The retracted raw glass sheet A2 enters the transverse stretching extension unit D from the preheating unit C. The transverse clamping extension wheels D1 change a rotation direction thereof through the external turbine rotating shaft D2 to achieve rotation, thereby inhibiting the inward contraction of the width of the raw glass sheet A2 after preheating.

In S3, the raw glass sheet A2 enters the longitudinal traction stretching unit E from the transverse stretching extension unit D. The raw glass sheet A2 is cooled in the longitudinal traction stretching unit E and is longitudinally in traction and stretched by the stretching clamping wheels E1. The transmission speed of the raw glass sheet A2 is controlled to be V2.

In S4, the raw glass sheet A2 enters the annealing unit F from the longitudinal traction stretching unit E, and a temperature field in this zone is kept at a temperature in a range of 600° ° C. to 800° ° C. through the matching adjustment of the temperature and speed of the annealing unit F.

In S5, the raw glass sheet A2 enters the winding and wrapping unit G from annealing unit F, and after natural cooling, the annealed raw glass sheet A2 is wrapped in a winding way through the winding mechanism G1, thereby achieving continuous production.

In some embodiments of the present disclosure, the air floatation devices are disposed, which may maintain the environmental pressure difference between the upper and lower parts of the raw glass sheet, realize that the pressure of the lower part of the raw glass sheet is greater than that of the upper part P, effectively alleviate the downward bending tendency due to gravity during the transverse transmission of the raw glass sheet, and ensure that the raw glass sheet maintains a stable shape in the stretching and transmission process, and strengthen control of thickness, warpage, and stress during stretching of the raw glass sheet.

In some embodiments, the cross-stretching is performed on the raw glass sheet using the transverse stretching extension unit and the longitudinal traction stretching unit, which prevents the contraction of the raw glass sheet. Through the coordination of the heating unit and the cooling mechanisms, the temperature may be effectively controlled.

The device for a horizontal secondary stretching of ultra-thin flexible glass is divided into seven functional zones of feeding, welding, preheating, extension, stretching, annealing, and winding. In some embodiments of the present disclosure, through the transmission and secondary stretching, the substrate raw glass sheet produced by the overflow manner passes through the feeding zone, is preheated to near the softening point by the laser welding device, and passes through the transverse clamping extension mechanism, which effectively reduces the width contraction of the raw glass sheet.

In some embodiments, the raw glass sheet is longitudinally stretched by the longitudinal stretching mechanism, and the stretched raw glass sheet is annealed and wound, so that the continuous production of the ultra-thin flexible glass may be achieved, and the produced ultra-thin flexible glass has a high surface quality and does not need a secondary polishing. Therefore, the technical problem that the ultra-thin flexible glass may not be continuously produced through the secondary stretching or the ultra-thin flexible glass is produced with a small size may be effectively solved, and the surface quality of products produced by the overflow manner may be maintained.

In some embodiments, the device for a horizontal secondary stretching of ultra-thin flexible glass further includes a deflection correction control device. The deflection correction control device includes an image detection device or a deflection correction sensor.

The deflection correction control device is a device for correcting a deviation in the position of the raw glass sheet A2. In some embodiments, the deflection correction control device may be disposed on a roller assembly. For example, the deflection correction control device may be disposed between the two clamping transmission rollers, between the two transverse clamping extension wheels D1, between the two stretching clamping wheels I E1, and between the two stretching clamping wheels II F1. More descriptions regarding the roller assembly may be found above.

The image detection device is a device for detecting a deviation in an edge position of the raw glass sheet A2. For example, the image detection device may be used to detect whether the deviation in the edge position of the raw glass sheet A2 occurs through an edge detection algorithm, a Hough transform, an optical flow method, etc. The deflection correction sensor is a sensor for detecting the deviation in the edge position of the raw glass sheet A2.

In some embodiments, the deviation correction control device is used to detect the deviation in the edge position of the raw glass sheet A2 using the image detecting device or deviation correction sensor and correct the deviation in the edge position of the raw glass sheet A2 by controlling the clamping transmission rollers, the transverse clamping extension wheels D1, the stretching clamping wheels I E1, and the stretching clamping wheels II F1.

In some embodiments, when the raw glass sheet A2 is in the feeding unit A, in response to the deviation correction control device detecting that the position deviation of the raw glass sheet A2 exceeds a preset deviation threshold, the deviation correction control device simultaneously controls the two symmetrically disposed clamping transmission rollers to clamp the raw glass sheet A2 and move the raw glass sheet A2 to a correct position in the length direction or the width direction, thereby correcting the position deviation of the raw glass sheet A2 in the zone of the feeding unit A.

The position deviation refers to a difference between a position of the zone where the raw glass sheet A2 is located in the feeding unit A and a preset position. The preset position refers to a position of each raw glass sheet A2 relative to each other when the preset raw glass sheets A2 are in the zone of the feeding unit A. For example, the preset position includes a distribution of the position of each raw glass sheet A2 at an equal interval in the length direction, a distribution of the position of each raw glass sheet A2 at an arithmetic interval in the length direction, a preset width position for each raw glass sheet A2, etc. The preset position and the preset deviation threshold may be determined based on historical data or prior knowledge. The deviation correction control device is used to correct the position deviation of the raw glass sheet A2 in the zone of the feeding unit A, so that the two raw glass sheets A2 may be aligned more accurately in the width direction when the two raw glass sheets A2 are welded in the welding unit B, which ensures that the distance of the raw glass sheet A2 in the length direction meets the welding requirements.

In some embodiments, as shown in FIG. 4, when the raw glass sheet A2 is in the transverse stretching extension unit D, in response to the deviation control device detecting a deviation of the raw glass sheet A2, the deviation control device controls the two transverse clamping extension wheels D1 symmetrically placed on the raw glass sheet A2, thereby correcting the deviation of the raw glass sheet A2 in the zone of the transverse stretching extension unit D. For example, if the raw glass sheet A2 deviates towards the transverse clamping extension wheel D1 on one side, the clamping force of the transverse clamping extension wheel D1 on the side on the raw glass sheet A2 is reduced, and the clamping force of the transverse clamping extension wheel D1 on another side on the raw glass sheet A2 is increased, so that the raw glass sheet A2 moves towards the side with a relatively large clamping force, thereby correcting the deviation.

In some embodiments, the transverse clamping extension wheel D1 is used to apply the clamping force to the raw glass sheet A2 through a clamping area. The clamping area refers to a contact area between the transverse clamping extension wheels D1 and the raw glass sheet A2 when the transverse clamping extension wheels D1 clamps the raw glass sheet A2. In some embodiments, the clamping force of the transverse clamping extension wheels D1 on the raw glass sheet A2 is positively correlated with the clamping area. That is, by adjusting the clamping area of the transverse clamping extension wheels D1 to the raw glass sheet A2, the clamping force of the transverse clamping extension wheels D1 on the raw glass sheet A2 may be adjusted.

In some embodiments, when the raw glass sheet A2 is in the longitudinal traction stretching unit E, in response to the deviation correction control device detecting that an angle deviation of the raw glass sheet A2 occurs, the deviation correction control device may control the two symmetrically disposed stretching clamping wheels I E1 to adjust the angle, so that the stretching clamping wheels I E1 are tilted, thereby correcting the deviation of the raw glass sheet A2 in the zone of the longitudinal traction stretching unit E. For example, if the raw glass sheet A2 deviates towards the stretching clamping wheel I E1 on one side, the raw glass sheet A2 is stretched to the right side as a whole by controlling the two symmetrically disposed stretching clamping wheels I E1 to tilt at a small angle towards another side.

In some embodiments, the deviation correction control device is used to correct and eliminates the deviation of the edge position of the raw glass sheet A2 in each zone, which may reduce the waste of material caused by the position deviation of the raw glass sheet A2 and improve the production speed and product quality of the ultra-thin flexible glass.

In some embodiments, the device for a horizontal secondary stretching of ultra-thin flexible glass include an image unit and a processor. The image unit is configured to capture at least a side-view image containing the raw glass sheet A2. In some embodiments, the processor is configured to determine an inclination sequence and a vibration characteristic sequence of the raw glass sheet A2 based on a sequence of side-view images of the raw glass sheet A2 captured by the image unit; determine an amount of adjustment of an intake rate of each air inlet pipe L4 and an amount of adjustment of a suction rate of each air suction pipe L5 based on the inclination sequence and the vibration characteristic sequence; and generate adjustment instructions based on the amount of adjustment of the intake rate of each air inlet pipe L4 and the amount of adjustment of the suction rate of each air suction pipe L5 and at least send the adjustment instructions to each opening control valve L51.

The image unit is a camera device used to capture the side-view image of the raw glass sheet A2. The image unit may be communicatively connected to the processor.

The side-view image refers to an image including a side of the raw glass sheet A2. The side of the raw glass sheet A2 is a plane consisting of a length direction and a height direction, or a width direction and a height direction, and the height direction may be a direction used to describe the thickness of the raw glass sheet A2.

The sequence of side-view images is a sequence consisting of side-view images of the raw glass sheet A2. In some embodiments, the processor may form the sequence of side-view images based on the side-view images of the raw glass sheet A2 taken at different moments in chronological order.

The inclination sequence is a sequence consisting of the inclined angles of the raw glass sheet A2 at a plurality of moments in a preset time interval. The inclined angle refers to an angle between a plane formed by the raw glass sheet A2 and a horizontal plane.

The vibration characteristic sequence refers to a sequence consisting of the vibration characteristics of the raw glass sheet A2 at the plurality of moments in a preset time interval. The vibration characteristics refer to data information that reflects the vibration of the raw glass sheet A2. Each vibration characteristic includes a vibration amplitude, a vibration direction, etc. For example, the vibration characteristic sequence may be represented by {(a,b,c), (d,e,f), . . . }, where a and d denote different moments, b and e denote the vibration amplitudes at the corresponding moments, and c and f denote the vibration directions at the corresponding moments.

The preset time interval may be determined in advance by a staff member or the processor based on historical experience.

In some embodiments, the processor may determine the inclination sequence and the vibration characteristic sequence of the raw glass sheet A2 by vector retrieval based on the sequence of side-view images of the raw glass sheet A2. For example, the processor may construct a vector to be matched using the sequence of side-view images as an element. The processor may obtain a reference vector whose vector distance from the vector to be matched is smaller than a distance threshold by retrieving the vector database based on the vector to be matched and determine a historical inclination sequence and a historical vibration characteristic sequence corresponding to the reference vector as a currently required inclination sequence and a currently required vibration characteristic sequence. The vector database stores a plurality of reference vectors and their corresponding historical inclination sequences and historical vibration characteristic sequences. The reference vectors are constructed based on historical side-view image sequences, the historical inclination sequences are actual inclination sequences corresponding to the historical side-view image sequences, and the historical vibration characteristic sequences are actual vibration characteristic sequences corresponding to the historical side-view image sequences.

The amount of adjustment refers to a parameter used to control the air inlet pipe L4 and a parameter used to control the air suction pipe L5. For example, the amount of adjustment includes "reducing the intake rate of each air inlet pipe L4 and increasing the suction rate of each air suction pipe L5," "controlling the intake rate of the air inlet pipe and the suction rate of the air suction pipe based on a preset pulse frequency," etc.

In some embodiments, the processor may determine the amount of adjustment in various ways. For example, the processor may determine the amount of adjustment of the air inlet pipe L4 and the amount of adjustment of the air suction pipe L5 based on the inclination sequence and the vibration characteristic sequence using an amount of adjustment relationship table. The amount of adjustment relationship table refers to a preset table that includes a correspondence between the inclination sequence, the vibration characteristic sequence, and the amount of adjustment. The amount of adjustment relationship table may be constructed based on the correspondence between the historical inclination sequence, the historical vibration characteristic sequence, and the historical amount of adjustment.

In some embodiments, the processor is configured to determine, based on the inclination sequence and the vibration characteristic sequence, whether the intake rate of the air inlet pipe L4 and the suction rate of the air suction pipe L5 need to be adjusted; in response to the intake rate of the air inlet pipe L4 and the suction rate of the air suction pipe L5 needing to be adjusted, generate a plurality of pieces of candidate amount of adjustment distribution data; for each piece of candidate amount of adjustment distribution data, predict a stability degree using a stability degree prediction model, the stability degree prediction model being a machine learning model; determine target amount of adjustment distribution data based on the stability degree corresponding to each piece of candidate amount of adjustment distribution data; and determine the amount of adjustment of the intake rate of each air inlet pipe L4 and the amount of adjustment of the suction rate of each air suction pipe L5 based on the target amount of adjustment distribution data.

In some embodiments, in response to either the inclination sequence or the vibration characteristic sequence satisfying a preset rule, the processor determines that the intake rate of the air inlet pipe L4 and the suction rate of the air suction pipe L5 need to be adjusted. For example, the preset rule includes there is a preset count of elements in the inclination sequence whose values are greater than a preset inclination threshold, there is a preset count of elements in the vibration characteristic sequence whose values are greater than a preset vibration amplitude threshold, etc. The preset count number, the preset inclination threshold, and preset vibration amplitude threshold may be determined in advance by a staff member or the processor based on historical experience.

The candidate amount of adjustment distribution data refers to a candidate parameter that may serve as the target amount of adjustment distribution data. In some embodiments, the candidate amount of adjustment distribution data includes a candidate amount of adjustment of the intake rate of each air inlet pipe L4 and a candidate amount of adjustment of the suction rate of each air suction pipe L5. More descriptions regarding the target amount of adjustment distribution data may be found below.

The candidate amount of adjustment refers to a candidate parameter that may be used as a target amount of adjustment.

In some embodiments, the processor may generate the candidate amount of adjustment distribution data in various ways. For example, the intake rate of each air inlet pipe L4 may be randomly generated in a range from a rated minimum of the intake rates of the air inlet pipes L4 to a rate maximum of the intake rates of the air inlet pipes L4. Similarly, the suction rate of each air suction pipe L5 may be randomly generated.

The stability degree prediction model is a machine learning model used to determine the stability degree. In some embodiments, the stability degree prediction model may include a Deep Neural Networks (DNN) model, other custom model structures, or the like, or any combination thereof.

In some embodiments, an input of the stability degree prediction model includes each piece of candidate amount of adjustment distribution data, the inclination sequence, the vibration characteristic sequence, the intake rate of each air inlet pipe L4, and the suction rate of each air suction pipe L5, and an output of the stability degree prediction model includes the stability degree.

The stability degree is a parameter used to characterize an ability of the raw glass sheet A2 to maintain stability.

In some embodiments, the stability degree prediction model may be obtained by training a large number of first training samples with first labels in various ways. For example, the training may be based on a gradient descent manner. Merely by way of example, the plurality of first training samples with first labels may be input into an initial stability degree prediction model, and a loss function may be constructed based on the first labels and results of the initial stability degree prediction model. Parameters of the initial stability degree prediction degree model may be iteratively updated based on the loss function. The model training is
completed when the loss function of the initial stability
degree prediction model satisfies a preset iteration condition,
and a trained stability degree prediction model is obtained.
The preset iteration condition may be that the loss function
converges, a count of iterations reaches a threshold, etc.

In some embodiments, the first training sample(s) may
include sample candidate amount of adjustment distribution
data, a sample inclination sequence, a sample vibration
characteristic sequence, a sample intake rate of each air inlet
pipe L4, and a sample suction rate of each air suction pipe
L5, which may be constructed based on historical process
data.

In some embodiments, the first label(s) may be an actual
stability degree of the raw glass sheet A2 corresponding to
the first training sample. The actual stability degree is
negatively correlated with an average of inclined angles and
an average of vibration amplitudes of the raw glass sheet A2
at the plurality of moments in a preset target time period,
respectively.

The preset target time period refers to an adjusted time
period corresponding to the first training sample. The preset
target time period may be determined in advance by the staff
member or the processor based on historical experience.

For example, the processor may determine the actual
stability degree based on the following equation (2).

$$H = \frac{1}{1 + \bar{J} + \bar{K}} \tag{2}$$

wherein H denotes the stability degree; $\bar{J}$ denotes the
average of inclined angles of the raw glass sheet A2 at
the plurality of moments in the preset target time
period; and $\bar{K}$ denotes the average of vibration ampli-
tudes of the raw glass sheet A2 at the plurality of
moments in the preset target time period.

The target amount of adjustment distribution data refers to
a parameter used to control the air intake rate of each air inlet
pipe L4 and a parameter used to control the air suction rate
of each air suction pipe L5. In some embodiments, the
processor determines the stability degree corresponding to
each piece of candidate amount of adjustment distribution
data, and candidate amount of adjustment distribution data
corresponding to a highest stability degree is determined as
the target amount of adjustment distribution data.

A working environment in which the device for a hori-
zontal secondary stretching of ultra-thin flexible glass is
usually complex. There is often unpredictable turbulence in
the air. This turbulence may disturb the pressure difference
between the upper and lower parts of the raw glass sheet A2,
so that the downward bending tendency of the raw glass
sheet A2 may not be reduced. In addition, the airflow
generated by the operation of the air inlet pipe L4 and the air
suction pipe L5 may also disturb the pressure difference
between the upper and lower parts of the raw glass sheet A2.

In view of this, in some embodiments, the air intake rate
of the air inlet pipe L4 and the air suction rate of the air
suction pipe L5 are adjusted by determining the target
amount of adjustment distribution data, which may effec-
tively offset the disturbance of turbulence in the air on the
pressure difference between the upper and lower parts of the
raw glass sheet A2, restore the equilibrium, and alleviate the
downward bending tendency of the raw glass sheet A2.

In some embodiments, the input of the stability degree
prediction model also include a first size parameter, a second
size parameter, and a material characteristic.

The first size parameter is a parameter related to the size
of the raw glass sheet A2. The second size parameter is a
parameter related to the size of the stretched flexible glass.
For example, the first size parameter and the second size
parameter each include a thickness, a bending radius, an
edge straightness, etc.

The first size parameter and the second size parameter
may be determined by various measuring devices. For
example, the various measuring devices include an ultra-
sonic thickness gauge, an optical interferometer, etc. The
processor may be communicatively connected to an ultra-
sonic thickness gauge, an optical interferometer, etc. to
obtain the first size parameter and the second size parameter.

The material characteristic is data information used to
reflect a material property of the stretched flexible glass. For
example, the material characteristic includes light transmis-
sion, bending resistance, strength, etc.

The material characteristic may be determined by various
measurement devices. For example, various measuring
devices include a spectrophotometer, a Universal Testing
Machine (UTM), etc.

More descriptions regarding the stretched flexible glass
may be found above. More descriptions regarding the first
size parameter, the second size parameter, and the material
characteristic may be found below.

In some embodiments, when the input of the stability
degree prediction model includes the first size parameter, the
second size parameter, and the material characteristic, the
first training sample(s) may also include a sample first size
parameter, a sample second size parameter, and a sample
material characteristic.

It may be understood that vibration and inclination gen-
erated by the raw glass sheet A2 is related to a physical
property or a material strength of the raw glass sheet A2. The
physical property or the material strength of the raw glass
sheet A2 are determined by its size parameter and material
characteristic. In some embodiments of the present disclo-
sure, the size parameter of the raw glass sheet A2, the size
parameter of the stretched flexible glass, and the material
characteristic of the stretched flexible glass are further used
as the input of the stability degree prediction model, which
improves the accuracy of predicting the stability degree of
raw glass sheet A2, facilitates the subsequent determination
of the target amount of adjustment distribution data.

The adjustment instruction is an instruction used to con-
trol the opening control valve L51.

In some embodiments, the processor may generate the
adjustment instruction in various ways based on the amount
of adjustment of each air inlet pipe L4 and the amount of
adjustment of each air suction pipe L5. For example, the
processor generates the adjustment instruction based on the
amount of adjustment of the intake rate of each air inlet pipe
L4 and the amount of adjustment of the suction rate of each
air suction pipe L5 to adjust an opening degree of the
opening control valve L51 (e.g., an opening angle or an
opening percentage). The opening degree of the opening
control valve L51 is positively correlated with the suction
rate of the air suction pipe L5 and negatively correlated with
the intake rate of the air inlet pipe L4.

The processor may send the adjustment instruction to
each opening control valve L51 via various feasible means
(e.g., serial communication or Wi-Fi).

In some embodiments of the present disclosure, the intake
rate of the air inlet pipe L4 and the suction rate of the air suction pipe L5 are determined and adjusted by combining the inclination sequence and the vibration characteristic sequence of the raw glass sheet A2, which ensures that when the raw glass sheet A2 vibrates or is inclined greatly, a stable pressure difference between the upper and lower parts of the raw glass sheet A2 is maintained, and the arc-shaped sagging tendency of the raw glass sheet A2 is reduced.

In some embodiments, the processor is further configured to determine a preferred process parameter based on the first size parameter, the second size parameter, and the material characteristic. In some embodiments, the preferred process parameter at least includes a preferred transmission speed of the raw glass sheet A2 and a preferred temperature of each unit. The processor sends the preferred process parameter to at least one of the units.

The preferred process parameter is a parameter that ensures that each unit is in a good operating condition.

The units include the feeding unit A, the welding unit B, the preheating unit C, the transverse stretching extension unit D, the longitudinal traction stretching unit E, the annealing unit F, and the winding and wrapping unit G. More descriptions may be found above.

The preferred transfer speed is a clamping transmission speed that may ensure that the raw glass sheet A2 is in a good operating condition. More descriptions regarding the clamping transmission speed may be found above.

The preferred temperature is an environment temperature that ensures each unit is in a good operating condition.

In some embodiments, the processor may determine a candidate preferred process parameter by performing vector retrieval based on the first size parameter, the second size parameter, and the material characteristic.

For example, the processor may construct a vector to be matched based on the first size parameter, the second size parameter, and the material characteristic. The processor may retrieve in a process parameter database based on the vector to be matched, obtain a reference vector whose vector distance from the vector to be matched is smaller than a distance threshold, and determine a historical preferred process parameter corresponding to the reference vector as a currently required preferred process parameter.

The process parameter database is used to store, index, and query the preferred process parameter and stores a plurality of reference vectors and their corresponding historical preferred process parameters. The reference vectors are constructed based on historical first size parameters, historical second size parameters, and historical material characteristics. The historical preferred process parameters are preferred process parameters that actually correspond to the historical first size parameters and the historical second size parameters. The process parameter database may be constructed in advance based on historical data or prior knowledge.

The candidate preferred process parameter refers to a parameter that may be used as a preferred process parameter. The candidate preferred process parameter at least includes a candidate transmission speed of the raw glass sheet A2 and a candidate temperature of each unit. Similarly, the candidate transmission speed refers to a parameter that may be used as the preferred transmission speed. The candidate temperature refers to a parameter that may be used as the preferred temperature.

In some embodiments, the processor may generate more candidate process parameters by adjusting the candidate process parameter in a preset floating range. For example, if the preset floating range of the candidate transmission speed and the preset floating range of the candidate temperature are 5% and 10%, respectively, the candidate transmission speed may only be increased or decreased by up to 5%, and the candidate temperature may only be increased or decreased by up to 10%. The preset floating range may be determined by a staff member or the processor based on historical experience.

In some embodiments, the processor may determine an estimate yield corresponding to each candidate process parameter set based on each candidate process parameter through a production effect prediction model.

The production effect prediction model is a machine learning model used to determine a production effect. In some embodiments, the production effect prediction model may include a deep neural networks (DNN) model, other custom model structures, or the like, or any combination thereof.

In some embodiments, an input of the production effect prediction model includes the first size parameter, the second size parameter, the material characteristic, and the candidate process parameter, and an output of the production effect prediction model includes the estimate yield.

The estimate yield is a parameter used to evaluate a production effect of the ultra-thin flexible glass. The higher the estimated yield, the better the production effect of the ultra-thin flexible glass.

In some embodiments, the production effect prediction model may be obtained by training a large number of second training samples with second labels in various ways. The training way of the production effect prediction model is the same as that of the stability degree prediction model mentioned, which is repeated herein.

In some embodiments, the second training sample(s) may include a sample first size parameter, a sample second size parameter, a sample material characteristic, and a sample candidate process parameter, which may be constructed based on historical production data. The second label(s) may be an actual yield of the ultra-thin flexible glass corresponding to the second training sample.

In some embodiments, the processor may determine the actual yield based on an evaluation metric of the ultra-thin flexible glass, which may be determined based on historical production data. For example, the evaluation indicator of the ultra-thin flexible glass includes thickness uniformity, hardness, and tensile strength, etc. The evaluation indicator is compared with a standard value. If the evaluation indicator is greater than the standard value, the actual yield is higher. If the evaluation indicator is smaller than the standard value, the actual yield is lower. The standard value may be predetermined by the staff member or the processor based on historical experience.

In some embodiments, the preferred process parameter further includes a preferred intake rate of each air inlet pipe L4 and a preferred suction rate of each air suction pipe L5. The input of the production effect prediction model further includes a candidate intake rate of each air inlet pipe L4 and a candidate suction rate of each air suction pipe L5, and the output of the production effect prediction model further includes a first adjustment frequency and a second adjustment frequency. In some embodiments, the processor may determine the preferred intake rate and the preferred extraction rate based on the first adjustment frequency and the second adjustment frequency.

The candidate intake rate refers to a parameter that may serve as the preferred intake rate. The preferred intake rate is an intake rate that may control the air inlet pipe L4 in a good operating condition.

The candidate suction rate refers to a parameter that may serve as the preferred suction rate. The preferred suction rate is an intake rate that may control the air suction pipe L5 in a good operating condition.

The candidate intake rate and the candidate suction rate are determined in the same manner as the candidate transmission speed and the candidate temperature. More descriptions may be found above, which is not repeated herein.

The first adjustment frequency refers to a frequency at which the intake rate of the air inlet pipe L4 is adjusted. The first adjustment frequency may include frequency values of adjusting the intake rates of the plurality of the air inlet pipes L4.

The second adjustment frequency is a frequency at which the suction rate of the air suction pipe L5 is adjusted. The second adjustment frequency may include frequency values of adjusting the suction rates of the plurality of the air suction pipes L5.

In some embodiments, when the input of the production effect prediction model includes the candidate intake rate and the candidate suction rate, the second training sample(s) also includes a sample candidate intake rate and a sample candidate suction rate, which may be constructed based on historical production data or simulated production data. The simulated production data may be obtained through computer simulation software, such as MATLAB.

In some embodiments, when the input of the production effect prediction model includes the candidate intake rate and the candidate suction rate, the second label(s) also includes a first adjustment frequency actually corresponding to the air inlet pipe L4 of the second training sample and a second adjustment frequency actually corresponding to the air suction pipe L5 of the second training sample, which may be determined based on historical production data or simulated production data. For example, in the production process of the ultra-thin flexible glass corresponding to the second training sample, the processor may determine the adjustment frequency actually corresponding to the intake rate of the air inlet pipe L4 and the adjustment frequency actually corresponding to the suction rate of the air suction pipe L5 as the second label.

It may be understood that the production effect depends not only on the estimated yield of the ultra-thin flexible glass, but also on the production efficiency and production costs of the ultra-thin flexible glass. That is, the higher the estimated yield, the lower the production efficiency, the lower the production costs, the better the production effect of the ultra-thin flexible glass. Obviously, the first adjustment frequency and the second adjustment frequency may affect the production efficiency and production costs of the ultra-thin flexible glass. Therefore, in some embodiments, the first adjustment frequency and the second adjustment frequency are determined through the production effect prediction model, so that the production effect of the ultra-thin flexible glass may be comprehensively evaluated.

In some embodiments, the processor determines a candidate transmission rate and a candidate temperature corresponding to a maximum estimated yield as the preferred transmission rate and the preferred temperature according to the estimated yield of each determined candidate process parameter. The processor determines the candidate intake rate corresponding to a smallest first adjustment frequency as the preferred intake rate according to the first adjustment frequency corresponding to each determined candidate process parameter. The processor determines the candidate suction rate corresponding to a smallest second adjustment frequency as the preferred suction rate based on the second adjustment frequency corresponding to each determined candidate process parameter.

In some embodiments of the present disclosure, the estimated yield corresponding to each candidate process parameter is predicted through the production effect prediction model, and the production effect of the ultra-thin flexible glass is determined based on the estimated yield, so as to determine the preferred process parameter from the candidate process parameter, which ensures that the device for a horizontal secondary stretching of ultra-thin flexible glass may be in a good operation condition and a production condition, thereby improving the quality of the produced ultra-thin flexible glass.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

These alterations, improvements, and modifications are intended to be suggested by this disclosure and are within the spirit and scope of the exemplary embodiments of this disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present disclosure) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A device for a horizontal secondary stretching of flexible glass, comprising: a feeding unit, a welding unit, a preheating unit, a transverse stretching extension unit, a longitudinal traction stretching unit, an annealing unit, and a winding and wrapping unit connected in sequence, wherein each of the feeding unit, the welding unit, the preheating unit, the transverse stretching extension unit, the longitudinal traction stretching unit, the annealing unit, and the winding and wrapping unit is provided with an air floatation device and a roller, the air floatation device is disposed on an upper side and a lower side of a raw glass sheet, the air floatation device being configured to maintain a pressure difference between the upper side and the lower side of the raw glass sheet, the roller is disposed on two sides of a width direction of the raw glass sheet, the roller being configured to clamp and transport the raw glass sheet; and each of the preheating unit, the transverse stretching extension unit, the longitudinal traction stretching unit, and the annealing unit is provided with a heating unit, the heating unit being disposed between the air floatation device and the raw glass sheet, and each of the longitudinal traction stretching unit and the annealing unit is provided with a cooling mechanism, the cooling mechanism being disposed between the heating unit and the raw glass sheet; wherein the heating unit includes a heat preservation layer, a plurality of heating devices and a plurality of soaking plates are disposed in the heat preservation layer, the plurality of soaking plates are symmetrically disposed on the upper side and the lower side of the raw glass sheet, each of the plurality of soaking plates is provided with a plurality of soaking-plate pores, the plurality of heating devices are disposed outside the plurality of soaking plates, respectively, and the cooling mechanism is disposed between the plurality of soaking plates and the plurality of heating devices.

2. The device for a horizontal secondary stretching of flexible glass according to claim 1, wherein the air floatation device includes a plurality of air inlet pipes, a plurality of air suction pipes, and a plurality of opening control valves, the plurality of air inlet pipes are disposed at a bottom of the feeding unit, a bottom of the welding unit, a bottom of the preheating unit, a bottom of the transverse stretching extension unit, a bottom of the longitudinal traction stretching unit, a bottom of the annealing unit, and a bottom of the winding and wrapping unit, the plurality of air suction pipes are disposed at a top of the preheating unit, a top of the transverse stretching extension unit, a top of the longitudinal traction stretching unit, and a top of the annealing unit, and the plurality of opening control valves are disposed outside the plurality of air suction pipes, to adjust an exhaust air volume of each of the plurality of air suction pipes.

3. The device for a horizontal secondary stretching of flexible glass according to claim 1, wherein a gas temperature in the air floatation device is consistent with a temperature of the feeding unit, a temperature of the welding unit, a temperature of the preheating unit, a temperature of the transverse stretching extension unit, a temperature of the longitudinal traction stretching unit, a temperature of the annealing unit, and a temperature of the winding and wrapping unit.

4. The device for a horizontal secondary stretching of flexible glass according to claim 1, wherein the heat preservation layer is embedded with a plurality of temperature detectors, and the plurality of temperature detectors are configured to pass through the heat preservation layer and the plurality of soaking plates, and to be close to the raw glass sheet.

5. The device for a horizontal secondary stretching of flexible glass according to claim 1, wherein the plurality of soaking plates are made of a silicon-carbide material, and the plurality of heating devices are made of an iron-chromium-aluminum material or a silicon-molybdenum material.

6. The device for a horizontal secondary stretching of flexible glass according to claim 1, wherein the each of the feeding unit, the welding unit, and the preheating unit is provided with a plurality of clamping transmission rollers, the transverse stretching extension unit is provided with a plurality of transverse clamping extension wheels, the longitudinal traction stretching unit is provided with a plurality of stretching clamping wheels I, the annealing unit is provided with a plurality of stretching clamping wheels II, and the winding and wrapping unit is provided with a rotary winding mechanism.

7. The device for a horizontal secondary stretching of flexible glass according to claim 6, wherein a rotational speed ratio of the plurality of clamping transmission rollers, the plurality of stretching clamping wheels I, and the plurality of stretching clamping wheels II is 1:n:n, wherein n is a ratio of a thickness of the raw glass sheet to a thickness of a stretched flexible glass.

8. The device for a horizontal secondary stretching of flexible glass according to claim 1, wherein a laser welder is disposed in the welding unit, the laser welder is configured to reciprocate in a width direction of the raw glass sheet, and the laser welder is capable of tracking positions of two anteroposterior raw glass sheets and completing welding of the two raw glass sheets.

* * * * *